United States Patent
Hasegawa

(10) Patent No.: US 10,362,193 B2
(45) Date of Patent: Jul. 23, 2019

(54) INFORMATION CONVERSION APPARATUS CAPABLE OF CHANGING ATTRIBUTION INFORMATION OF AN IMAGE BASED ON VIEWER INFORMATION AND NON-TRANSITORY COMPUTER READABLE MEDIUM STORING PROGRAM

(71) Applicant: FUJI XEROX CO., LTD., Tokyo (JP)

(72) Inventor: Hiroyuki Hasegawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/791,370

(22) Filed: Oct. 23, 2017

(65) Prior Publication Data

US 2018/0278796 A1 Sep. 27, 2018

(30) Foreign Application Priority Data

Mar. 23, 2017 (JP) .................. 2017-057992

(51) Int. Cl.
*G06K 9/00* (2006.01)
*G06K 9/18* (2006.01)
(Continued)

(52) U.S. Cl.
CPC ..... *H04N 1/32144* (2013.01); *G06K 9/00228* (2013.01); *G06K 9/18* (2013.01);
(Continued)

(58) Field of Classification Search
CPC ........... H04N 1/00854; H04N 1/00867; H04N 1/0087; H04N 1/00875; H04N 1/00925; H04N 1/2338; H04N 1/2376; H04N 1/32144; H04N 1/3232; H04N 1/32325; H04N 1/32336; H04N 1/387; H04N 3/4406; H04N 1/4413; H04N 1/442; H04N 1/444; G06K 9/00442; G06K 9/00456; G06K 9/00469; G06K 9/00496; G06K 9/00523; G06K 9/00536; G06K 9/00577; G06K 9/18; G06K 9/62; G06K 9/6267; G06K 9/78; G06K 2009/0059; G06K 15/1822;
(Continued)

(56) References Cited

U.S. PATENT DOCUMENTS 8,341,550 B2 * 12/2012 de Heer ............ G06Q 30/0251
  705/14.4
2003/0108241 A1 * 6/2003 Colmenarez ...... G06F 17/30265
  382/181

(Continued)

FOREIGN PATENT DOCUMENTS

JP   2003-204427   7/2003
JP   2004-357149   12/2004
JP   2005-159502   6/2005

*Primary Examiner* — Scott A Rogers
(74) *Attorney, Agent, or Firm* — JCIPRNET

(57) ABSTRACT

An information conversion apparatus includes an extraction unit that extracts attribute information added to an image, an acquisition unit that acquires viewer information indicating a viewer, a determination unit that uses a database indicating a relationship between a subject corresponding to the attribute information and the viewer corresponding to the viewer information, and determines the relationship between the subject and the viewer, and a conversion unit that converts the attribute information based on the determined relationship.

5 Claims, 7 Drawing Sheets

(51) Int. Cl.
  *G06K 9/78* (2006.01)
  *G06T 1/00* (2006.01)
  *H04N 1/00* (2006.01)
  *H04N 1/32* (2006.01)
  *G06Q 50/00* (2012.01)

(52) U.S. Cl.
  CPC ............... *G06K 9/78* (2013.01); *G06Q 50/01* (2013.01); *G06T 1/0021* (2013.01); *H04N 1/00408* (2013.01); *H04N 2201/3205* (2013.01); *H04N 2201/3235* (2013.01)

(58) Field of Classification Search
  CPC ........... G06K 15/1848; G06K 15/1882; G06K 15/1889; G06K 15/4095; G06F 3/1203; G06F 3/1204; G06F 3/1205; G06F 3/1206; G06F 3/1208; G06F 3/1237; G06F 3/1238; G06F 3/1242; G06F 3/1243; G06F 3/125
  See application file for complete search history.

(56) References Cited

U.S. PATENT DOCUMENTS

| | | | |
|---|---|---|---|
| 2005/0190400 A1* | 9/2005 | Redd | H04N 1/00204 358/1.15 |
| 2009/0327433 A1* | 12/2009 | Comertoglu | G06Q 10/107 709/206 |
| 2012/0311056 A1* | 12/2012 | Masuko | G06Q 50/01 709/206 |
| 2015/0339518 A1* | 11/2015 | Nakada | H04N 1/00336 382/115 |

* cited by examiner

INFORMATION CONVERSION APPARATUS CAPABLE OF CHANGING ATTRIBUTION INFORMATION OF AN IMAGE BASED ON VIEWER INFORMATION AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-057992 filed Mar. 23, 2017.

BACKGROUND

Technical Field

The present invention relates to an information conversion apparatus and a non-transitory computer readable medium storing a program.

SUMMARY

According to an aspect of the invention, there is provided an information conversion apparatus including an extraction unit that extracts attribute information added to an image; an acquisition unit that acquires viewer information indicating a viewer; a determination unit that uses a database indicating a relationship between a subject corresponding to the attribute information and the viewer corresponding to the viewer information, and determines the relationship between the subject and the viewer; and a conversion unit that converts the attribute information based on the determined relationship.

BRIEF DESCRIPTION OF THE DRAWINGS

Exemplary embodiment (s) of the present invention will be described in detail based on the following figures, wherein.

DETAILED DESCRIPTION

Exemplary Embodiment

Exemplary embodiments of the present invention will be described.

Printer and Information Addition Apparatus

Figure 1:
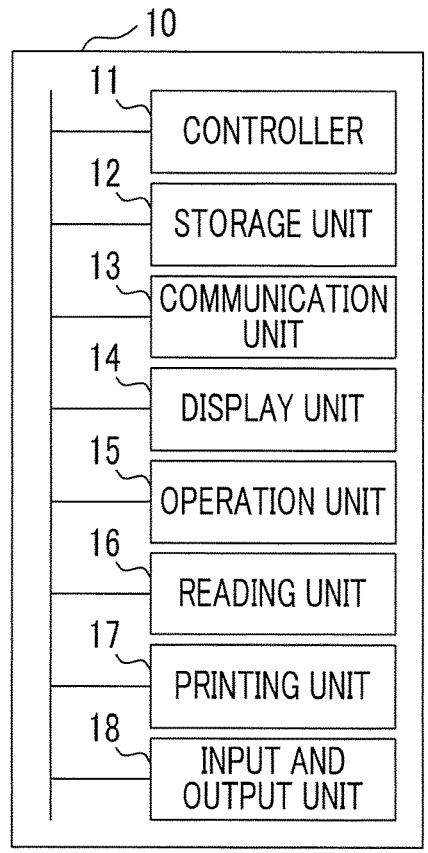
FIG. 1 is a diagram showing a hardware configuration of a printer 10.

FIG. 1 is a diagram showing a hardware configuration of a printer 10. The printer 10 includes a controller 11, a storage unit 12, a communication unit 13, a display unit 14, an operation unit 15, a reading unit 16, a printing unit 17, and an input and output unit 18. The storage unit 12 is a storage device such as a hard disk drive or a memory, and stores programs and data. The controller 11 includes a processor and a memory used as a work area for calculation, and executes a process according to a program stored in the storage unit 12. The communication unit 13 is a communication interface between the printer 10 and an external device, and includes, for example, an interface of a wired local area network (LAN).

The display unit 14 includes a display device such as a liquid crystal display panel, and displays a screen of a graphical user interface (GUI) in which a widget for operating the printer 10 is disposed. The operation unit 15 includes a pointing device and a hardware key, and receives an operation on the GUI. The pointing device is, for example, a touch panel that covers the display surface of the display unit 14. The hardware key receives operations such as switching a screen, entering a numerical value, and starting or stopping a process. The display unit 14 and the operation unit 15 may be configured as devices separated from the printer 10.

The reading unit 16 is, for example, an image scanner, and optically reads an image from a sheet-like recording medium. The printing unit 17 is, for example, a printer of an electrophotographic type or an inkjet type, and forms an image on a sheet-like recording medium. The input and output unit 18 is an input and output interface for connecting peripheral devices. The peripheral device is, for example, a storage device such as a flash memory or a hard disk drive.

The printer 10 has the function of the information addition apparatus 100 according to the present invention.

Figure 2:
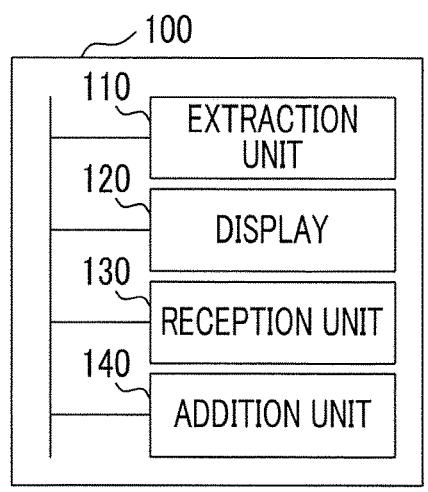
FIG. 2 is a diagram showing a functional configuration of an information addition apparatus 100.

FIG. 2 is a diagram showing a functional configuration of an information addition apparatus 100.

The extraction unit 110 extracts a subject from the image. The image data can be input to the printer 10 by various methods. As the method, for example, a method in which image data representing a photo captured with a digital still camera is input from a storage medium such as a flash memory, a method in which image data representing a photo is received through a network, a method in which photos formed on photographic paper, photos printed on paper, or the like are read by the reading unit 16 to generate image data, or the like are assumed. The controller 11 performs a face recognition image process on the image represented by the image data to extract a person. In this case, the subject is a person. In addition, in the storage unit 12, shape data items representing the shapes of various objects are registered in advance, and the controller 11 extracts an object matching the registered shape data from the image. In this case, the subject is an object.

The display 120 displays the subject on the display unit 14. Specifically, the controller 11 controls to display an image processed so that the visibility of the subject is improved, on the display unit 14. For example, an image in which a line surrounding the subject is added may be displayed, or an image in which an area other than the subject is replaced with a background of a predetermined single color may be displayed. In addition, the display 120 may display an image including a subject.

The reception unit 130 receives an input of attribute information. The attribute information is information indicating an attribute of the subject of the photo. For example, in a case where the subject is a person, the attribute information includes the full name, affiliation, study number, and the like of the person. In a case where the subject is an object, the attribute information includes the name of the object, the full name of the person related to the object, and the like. The reception unit 130 is realized by, for example, a software keyboard displayed on the display unit 14 and a touch panel provided in the operation unit 15, and attribute information is input by operating the touch panel. In other words, the attribute information is information for specifying or explaining the subject.

The addition unit 140 adds attribute information to the input image. Specifically, the controller 11 adds a digital watermark indicating attribute information to the image in association with the position of the subject. For example, the position to which the attribute information in the area of the image is added is specified by the operation on the touch panel. The controller 11 generates a digital watermark obtained by encoding the attribute information, performs a process of embedding a digital watermark in the designated position on the image data, and outputs the processed image data to the printing unit 17. The printing unit 17 prints an image to which the attribute information is added.

Figure 3:
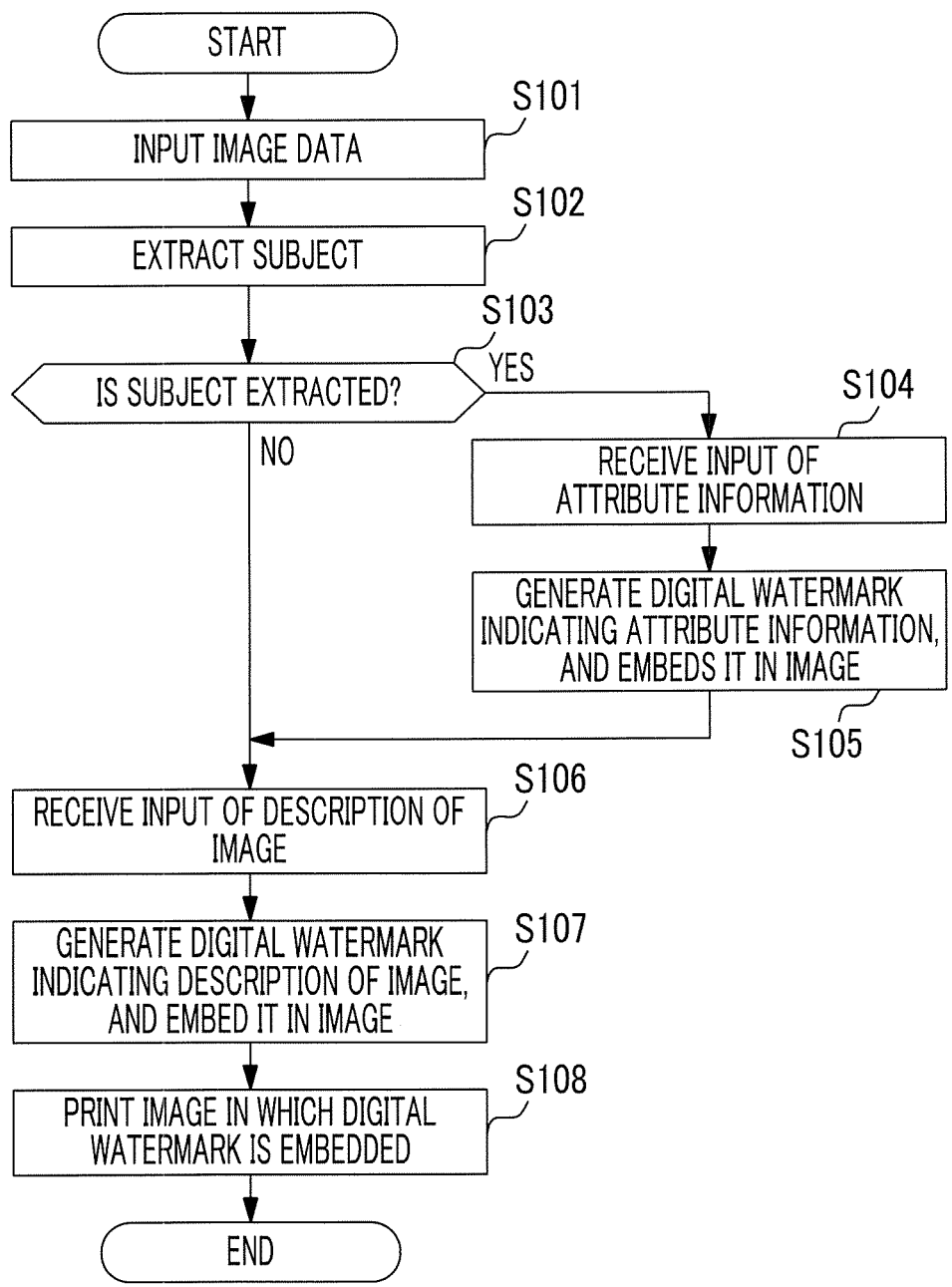
FIG. 3 is a flowchart of an information addition process.

FIG. 3 is a flowchart of an information addition process. A program that describes the procedure of the information addition process is installed in the printer 10, and each function of the information addition apparatus 100 is realized and the information addition process is executed, by the controller 11 executing this program.

Figure 4A:
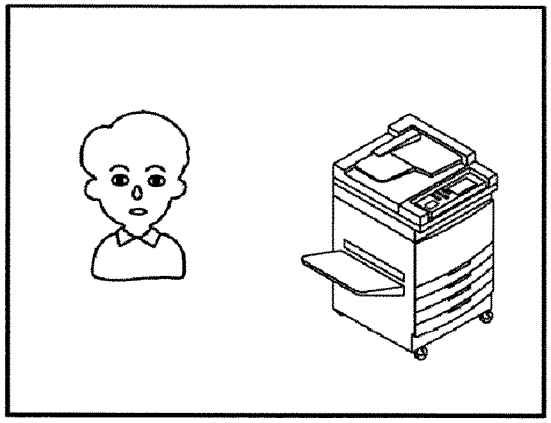
FIGS. 4A to 4C are diagrams showing an example of an image.
Figure 4B:
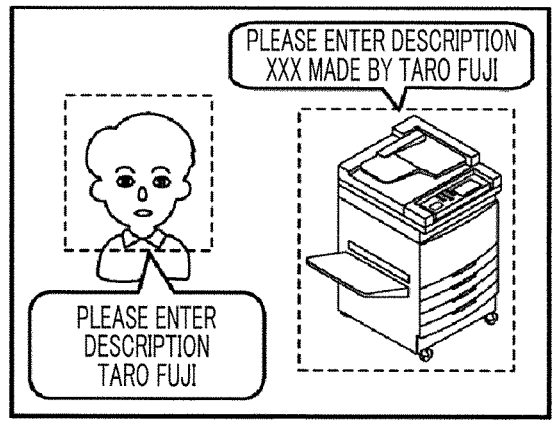
Figure 4C:
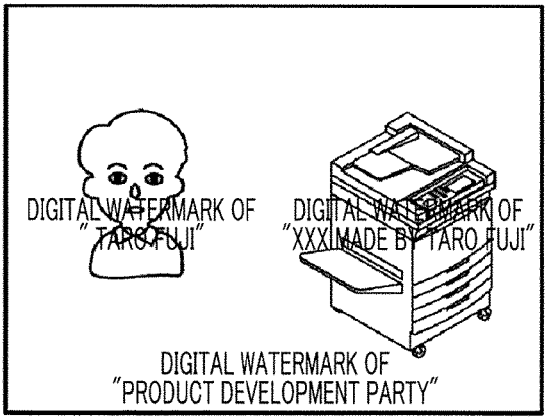

FIGS. 4A to 4C are diagrams showing an example of an image. FIG. 4A is a photo including a person and an object. This object is, for example, an electronic device in which this person is involved in commercialization. What is assumed as a user who uses the printer 10 is a person who can know the attribute information of a person who is the subject of the photo, for example, a person who is the subject himself, a relative or an acquaintance of this person, a photographer who captures the photo, or the like.

First, image data is input to the extraction unit 110 (step S101). Specifically, the user causes the reading unit 16 to read the photo shown in FIG. 4A. The reading unit 16 generates image data representing the read image.

Next, the extraction unit 110 executes the process of extracting the subject (step S102). In this example, the person shown in FIG. 4A is extracted, by the face recognition. Further, the object shown in FIG. 4A is extracted by recognizing the shape.

If the subject has been extracted by the extraction unit 110 (step S103: YES), the display 120 displays an image which is processed so as to improve the visibility of the subject, and the reception unit 130 receives the input of the attribute information (step S104). Specifically, as shown in FIG. 4B, a balloon including a line surrounding the subject and a text "Please enter a description" is displayed at a position corresponding to each of the subjects. When the user touches the balloon by using the touch panel function, a software keyboard is displayed, and the user inputs characters using the software keyboard. In this example, the full name "Taro Fuji" of the person is input as the attribute information of the person, and the text "XXX made by Taro Fuji" is input as the attribute information of the object. If the subject has not been extracted by the extraction unit 110 (step S103: NO), the process proceeds to step S106.

Next, the addition unit 140 generates a digital watermark indicating the attribute information, and embeds the digital watermark in the image (step S105). The position where the digital watermark is embedded is a position corresponding to each subject.

Next, the reception unit 130 receives the input of the description of the image (step S106). The description of the image may be an explanation about the entire image or an explanation about the subject. In this example, the text "product presentation party" is entered.

Next, the addition unit 140 generates a digital watermark indicating the description of the image, and embeds the digital watermark in the image (step S107). It is desirable that the position where the digital watermark is embedded is a position that does not overlap with the digital watermark of the attribute information. The addition unit 140 outputs to the printing unit 17, the image data representing the image in which the digital watermark is embedded. As a result, as shown in FIG. 4C, an image in which a digital watermark is embedded is printed (step S108). In this example, a digital watermark of the attribute information of a person is embedded at a position corresponding to a person, attribute information of the object is embedded at a position corresponding to the object, and a digital watermark of description of the image is embedded at the bottom of the image. In FIGS. 4A to 4C, the digital watermark is visualized for the sake of explanation, but in fact it is not perceived by human eyes.

Browsing Apparatus and Information Conversion Apparatus

Figure 5:
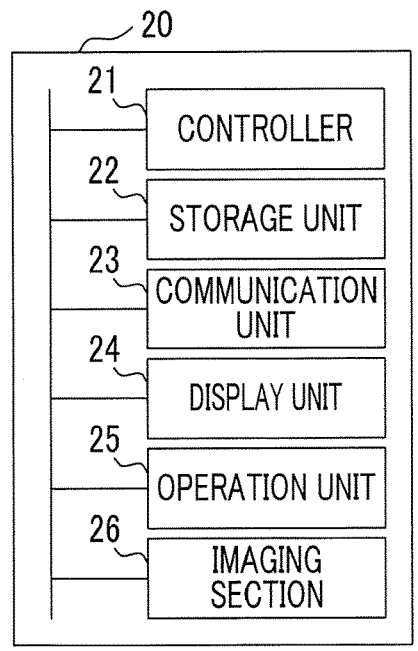
FIG. 5 is a diagram showing a hardware configuration of a browsing apparatus 20.

FIG. 5 is a diagram showing a hardware configuration of a browsing apparatus 20. The browsing apparatus 20 is, for example, a smartphone, a tablet, a notebook personal computer, or the like. The browsing apparatus 20 includes a controller 21, a storage unit 22, a communication unit 23, a display unit 24, an operation unit 25, and an imaging section 26. The storage unit 22 is a storage device such as memory, and stores programs and data. The controller 21 includes a processor and a memory used as a work area for calculation, and executes a process according to a program stored in the storage unit 22. The communication unit 23 is a communication interface between the browsing apparatus 20 and an external device, and includes, for example, a wireless LAN interface.

The display unit 24 includes a display device such as a liquid crystal display panel, and displays a GUI screen in which a widget for operating the browsing apparatus 20 is disposed. The operation unit 25 includes a pointing device and a hardware key, and receives an operation on the GUI. The pointing device is, for example, a touch panel that covers the display surface of the display unit 14. The hardware key receives an operation such as switching a screen. The imaging section 26 is, for example, a digital still camera, and generates image data representing the captured image. The generated image data is stored in the storage unit 22.

The browsing apparatus 20 has the function of the information conversion apparatus 200 according to the present invention.

Figure 6:
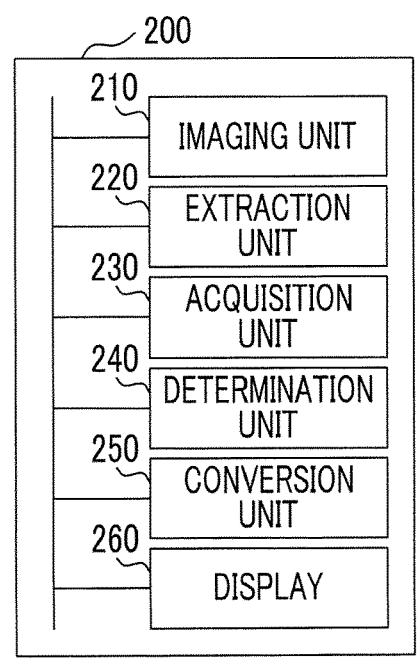
FIG. 6 is a diagram showing a functional configuration of an information conversion apparatus 200.

FIG. 6 is a diagram showing a functional configuration of an information conversion apparatus 200.

The imaging unit 210 is realized by the imaging section 26. The imaging section 26 images the printed matter printed by the printer 10, and generates image data representing the image of the printed matter.

The extraction unit 220 extracts attribute information added to an image. Specifically, the controller 21 extracts the attribute information by analyzing the image captured by the imaging section 26. More specifically, the controller 21 extracts a digital watermark by analyzing the image data generated by the imaging section 26, and decodes the extracted digital watermark to restore the attribute information. For example, the full name of the subject is extracted as attribute information.

The acquisition unit 230 acquires viewer information indicating a viewer. The viewer information is, for example, information indicating the full name of the user of the browsing apparatus, and is stored in the storage unit 22. The controller 21 reads viewer information from the storage unit 22.

A determination unit 240 uses a database indicating a relationship between a subject corresponding to the attribute information and the viewer corresponding to the viewer information, and determines the relationship between the subject and the viewer. The database is stored in the storage unit 22. In the database, for example, information representing the family tree of the viewer is stored. This information includes the full names of the viewer and the relatives of the viewer, and information indicating relationships between parents and children, brothers or sisters, a couple, or the like among relatives. In a case where both items corresponding to the attribute information extracted from the image and items corresponding to the viewer information are stored in the database, there is a high possibility that the subject of the image is a relative of the viewer. The controller 21 searches the database using the attribute information and the viewer information as keywords, and determines the family relation of the subject to the viewer.

The conversion unit 250 converts the attribute information based on the determined relationship. For example, if a family relation of the subject to the viewer is determined, the controller 21 changes the full name of the subject extracted as the attribute information to a family relation.

The display 260 displays the attribute information and the image converted by the conversion unit 250. For example, the controller 21 displays the captured image on the display unit 24, and displays the converted attribute information at the position where the digital watermark is embedded in the image, or in the vicinity thereof.

Figure 7:
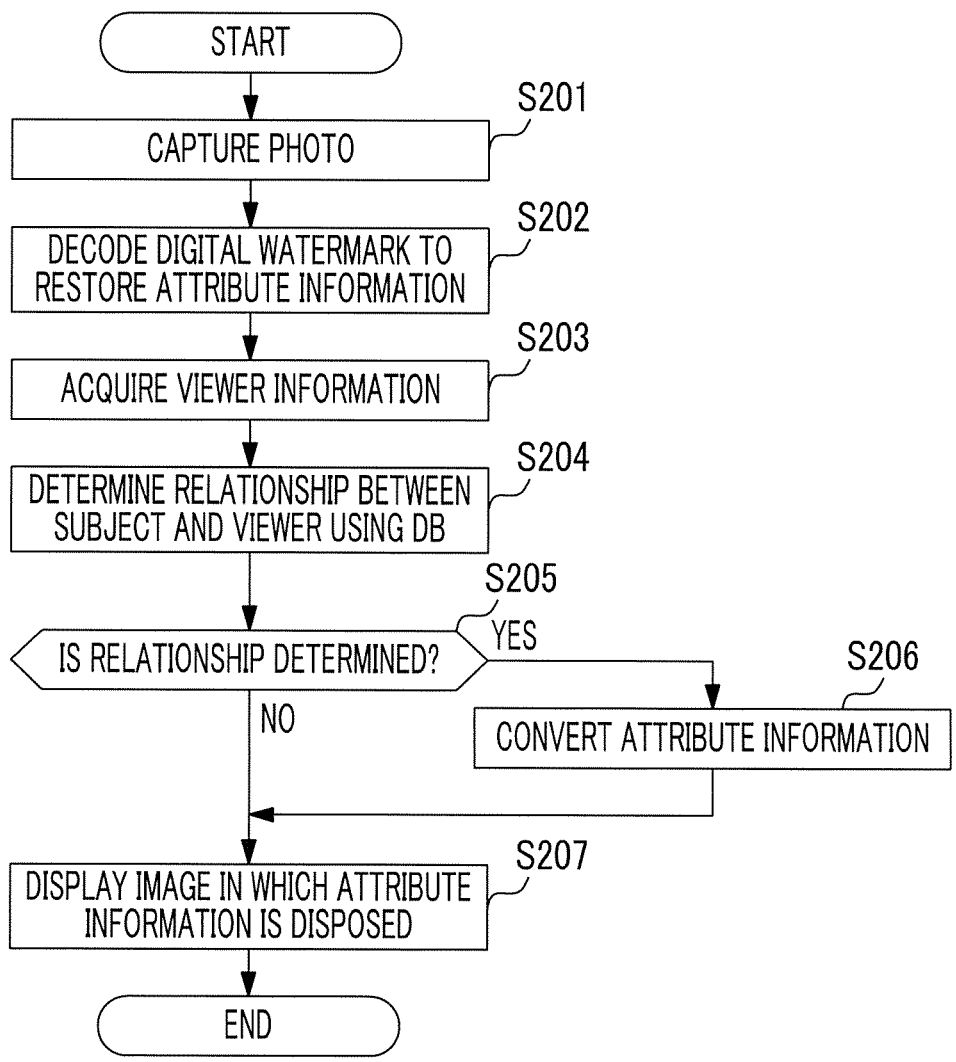
FIG. 7 is a flowchart of an information conversion process.

FIG. 7 is a flowchart of an information conversion process. A program that describes the procedure of the information conversion process is installed in the browsing apparatus 20, and each function of the information conversion apparatus 200 is realized and the information conversion process is executed, by the controller 21 executing this program.

What is assumed as a user who uses the browsing apparatus 20 is, for example, a relative of a person who is a subject.

Figure 8:
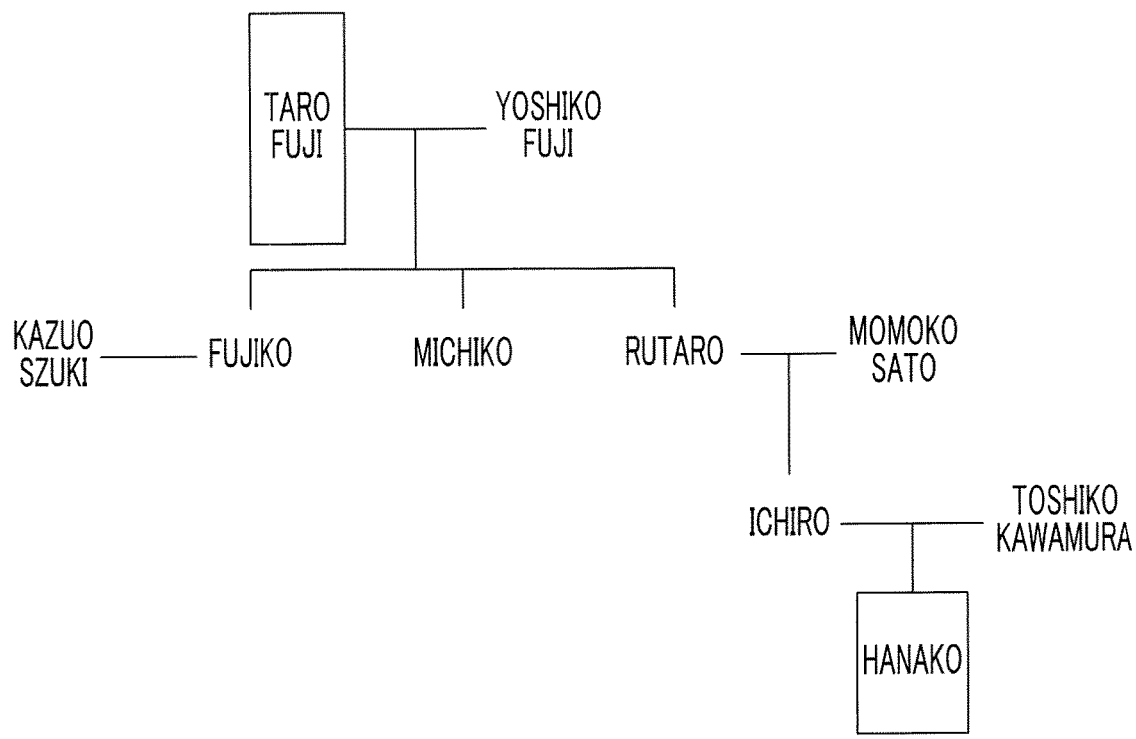
FIG. 8 is a family tree of a person who is a subject.

FIG. 8 is a family tree of a person which is a subject. In the following example, Hanako Fuji, who is the great-grandchild of Taro Fuji who is the subject, is the user of the browsing apparatus 20. Hanako Fuji possesses a photo printed by the printer 10 (FIG. 4C), but since he does not remember his grandfather's face, he does not know who the subject of the photo is.

First, the imaging unit 210 captures a photo (step S201). Specifically, the user activates the browsing apparatus 20 to capture a photo. The imaging unit 210 generates image data representing an image of a photo. Next, the extraction unit 220 extracts the digital watermark attached to the image, and decodes the digital watermark to restore the attribute information (step S202). As the attribute information, the texts "Taro Fuji" and "XXX made by Taro Fuji" are restored. Next, the acquisition unit 230 acquires viewer information (step S203). "Hanako Fuji" is acquired as viewer information.

Next, the determination unit 240 executes a process of determining the relationship between the subject and the viewer using the database (step S204). When the attribute information "Taro Fuji" and viewer information "Hanako Fuji" are searched in the database, it is determined that the subject is the great grandfather of the viewer. If the relationship between the subject and the viewer is determined (step S205: YES), the conversion unit 250 converts the attribute information, based on the determined relation (step S206). Specifically, a table in which the relationship between the subject and the viewer and the term representing the relationship are associated with each other is stored in the storage unit 22, and the attribute information is converted using the table. For example, in a case where the family relation of the subject to the viewer is the great grandfather, "Hi-Grandpa" is associated as a term representing the great-grandfather, and the attribute information "Taro Fuji" is converted to "Hi-Grandpa". Further, the attribute information "XXX made by Taro Fuji" is converted into "XXX made by Hi-Grandpa". If the relationship between the subject and the viewer is not determined (step S205: NO), the process proceeds to step S207.

Next, the display 260 displays the image in which the attribute information is disposed (step S207). Specifically, the attribute information may be disposed at the position at which the digital watermark is embedded, but in order not to deteriorate the visibility of the subject, it is desirable to disposed the attribute information at a position not overlapping with the subject.

Figure 9A:
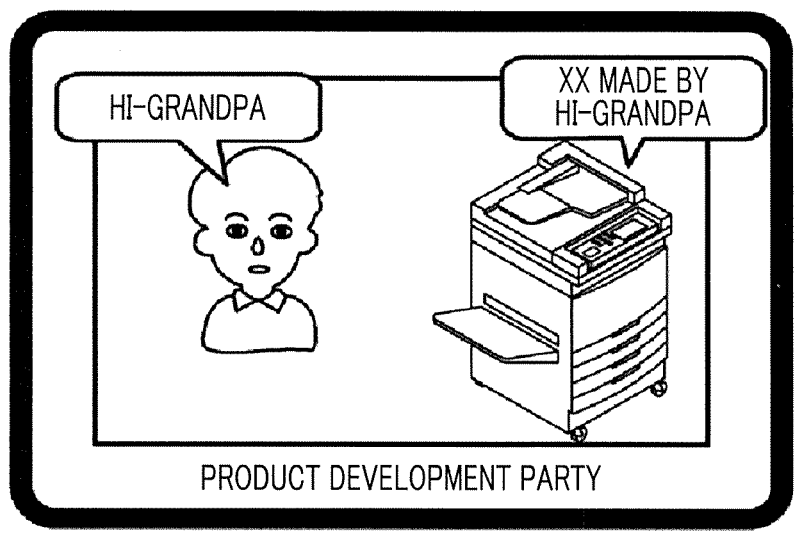
FIGS. 9A and 9B are diagrams showing an image in which attribute information is disposed.

FIG. 9A is a diagram showing an image in which attribute information is disposed. This example is an example in which the converted attribute information is displayed at a position separated by a predetermined distance in a direction away from the center of the image rather than the position where the digital watermark is embedded.

In the above example, since the user does not remember his grandfather's face, the user does not know who the subject is until the converted attribute information is displayed. This may be possible, for example, in a case where the viewer met a great grandfather before, but he does not remember his face, a case where the grandfather is alive but the viewer does not remember his face, a case where the viewer has never met a great grandfather, or the like. In order to prepare for such a case, for example, it is conceivable to add attribute information such as the name of the subject to the photo by handwriting or electronic devices. However, in a case where there is a temporal or spatial gap as described above, the relationship with the subject may not be determined from the name. Even in such a case, according to the present exemplary embodiment, information indicating the relationship between the viewer and the subject is provided to the viewer.

The above exemplary embodiment may be modified as follows.

Modification Example 1

Figure 9B:
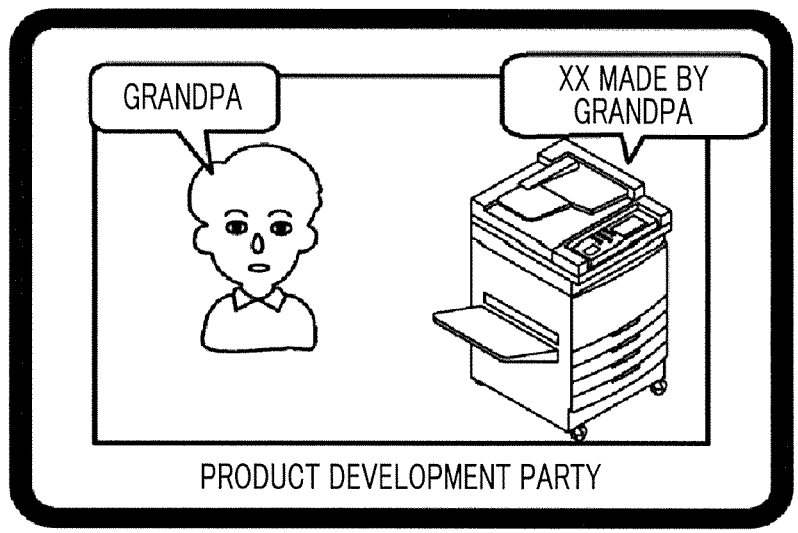

The information conversion apparatus 200 may be configured to receive the input of the viewer information and acquire the received viewer information. Specifically, in step S203 described above, a screen for inputting viewer information is displayed, and input of viewer information is received on the screen. For example, if "Ichiro Fuji" is input as viewer information, since Taro Fuji is the grandfather of Ichiro Fuji, the attribute information "Taro Fuji" is converted to "Grandpa" (see FIG. 9B).

Modification Example 2

The information addition apparatus 100 may be configured to add attribute information to each of plural images, in a case where the same subject is extracted from the plural images. Specifically, it may be configured such that feature values of subjects extracted from plural images are compared, and if the difference between feature values is less than a threshold value, it is determined that the subjects are the same subject, and common attribute information is added to images including the same subject.

Modification Example 3

The information addition apparatus 100 may add the attribute information as metadata to the image data. For example, attribute information may be described as metadata defined by the standard of Exchangeable image file format (Exif). In this case, the information addition apparatus 100 describes the position information indicating the position of the subject in the image area and the attribute information in association with each other in order to express the correspondence with the subject. The information conversion apparatus 200 displays the image in which the converted attribute information is disposed at the position indicated by the position information.

Modification Example 4

The information addition apparatus 100 may add visible attribute information to the image. For example, an example in which a digital watermark indicating attribute information is embedded (digital watermark is not actually perceived by human eyes) is shown in FIG. 4C, but the information addition apparatus 100 may add the attribute information to the image as a visible character string. In this case, the information conversion apparatus 200 extracts attribute information from the image by optical character recognition image processing, for example.

Modification Example 5

In the above exemplary embodiment, database storing information indicating a family tree as an example of a database showing the relationship between a subject and a viewer is illustrated, but various other databases are also assumed. For example, it is conceivable that assuming a database that stores information on a school's graduation list, a database is searched for attribute information of a subject (for example, a full name) and viewer information (for example, a full name), and if the class to which the subject belongs and the class to which the viewer belongs match, the attribute information of the subject is converted into "classmate".

For example, it is assumed a database in which various foreign language words (for example, English, French, and German words) having the same meaning as a Japanese word are associated with each other. It is assumed that Japanese noun representing the subject is added as the attribute information of the subject. It is conceivable that if information (for example, English) indicating the mother tongue of the viewer is input as the viewer information to the information conversion apparatus 200, English words corresponding to the Japanese words representing the subject are specified, and the attribute information is converted to English words.

Modification Example 6

The above exemplary embodiment describes the example in which the function of the information addition apparatus 100 is provided in the printer 10, but the information addition apparatus 100 may be configured as a separate apparatus from the printer 10. For example, a server having the function of the information addition apparatus 100 is provided, the image and the attribute information are transmitted from the printer 10 to the server, the server executes the information addition process to add the attribute information to the image, and transmits the image to which the attribute information is added, to the printer 10. Alternatively, a personal computer (hereinafter referred to as a PC) used by the user is provided with the function of the information addition apparatus 100, the image captured with the digital camera and the attribute information are input to the PC, and the PC executes the information addition process to add the attribute information, and transmits the image to which the attribute information is added, to the printer 10.

Modification Example 7

The above exemplary embodiment describes the example in which the function of the information conversion apparatus 200 is provided in the browsing apparatus 20, but the information conversion apparatus 200 may be configured as a separate apparatus from the browsing apparatus 20. For example, a server having the function of the information conversion apparatus 200 is provided, the image captured by the browsing apparatus 20 and the viewer information are transmitted to the server, the server executes the information conversion process to convert the attribute information, and transmits the image to which the information is added, to the browsing apparatus 20.

Modification Example 8

A database indicating the relationship between the subject and the viewer may be separated from the information conversion apparatus 200. For example, the database may be stored in a server, and the database may be searched by transmitting the attribute information and the viewer information from the information conversion apparatus 200 to the server.

Modification Example 9

The information conversion apparatus 200 may display an image to which both the attribute information before conversion and the attribute information after conversion are added.

Modification Example 10

A program for causing a computer to execute the above process may be provided in a state of being continuously stored in a computer readable recording medium such as an optical recording medium or a semiconductor memory, or may be provided through a network. In the case where the program according to the present invention is provided in a state of being continuously stored in a recording medium, the computer reads the program from the recording medium. Further, in a case where the program according to the present invention is provided through a communication network, the computer receives the program from the distribution source apparatus and uses it.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information conversion apparatus comprising
a processor, configured to function as:
    an extraction unit that extracts attribute information added to an image;
    an acquisition unit that acquires viewer information indicating a viewer;
    a determination unit that uses a database indicating a relationship between a subject corresponding to the attribute information and the viewer corresponding to the viewer information, and determines the relationship between the subject and the viewer; and
    a conversion unit that converts the attribute information based on the determined relationship; and
    a display that displays the attribute information which is converted by the conversion unit and the image.

2. The information conversion apparatus according to claim 1, the processor further configured to function as:
    a reception unit that receives an input of the viewer information,
    wherein the acquisition unit acquires the received viewer information.

3. The information conversion apparatus according to claim 1, further comprising a camera, configured to function as:
    an imaging unit for capturing the image,
    wherein the extraction unit extracts the attribute information by analyzing the image captured by the imaging unit.

4. The information conversion apparatus according to claim 2, further comprising a camera, configured to function as:
    an imaging unit for capturing the image,
    wherein the extraction unit extracts the attribute information by analyzing the image captured by the imaging unit.

5. A non-transitory computer readable medium storing a program being executed by a processor of an information conversion apparatus, the program comprising:
    an extraction unit that extracts attribute information added to an image;
    an acquisition unit that acquires viewer information indicating a viewer;
    a determination unit that uses a database indicating a relationship between a subject corresponding to the attribute information and the viewer corresponding to the viewer information, and determines the relationship between the subject and the viewer; and
    a conversion unit that converts the attribute information based on the determined relationship, wherein the attribute information which is converted by the conversion unit and the image is adapted to be displayed on a display.

* * * * *